(12) United States Patent
Yamaguchi et al.

(10) Patent No.: US 9,977,486 B2
(45) Date of Patent: May 22, 2018

(54) COMMUNICATION DEVICE INCLUDING TWO CONTROLLERS, A METHOD FOR CUSTOMIZING THE SAME, AND COMPUTER-READABLE STORAGE MEDIUM FOR COMPUTER PROGRAM

(71) Applicant: Konica Minolta, Inc., Tokyo (JP)

(72) Inventors: Takehisa Yamaguchi, Nara (JP); Masami Yamada, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 14/477,147

(22) Filed: Sep. 4, 2014

(65) Prior Publication Data

US 2015/0067371 A1   Mar. 5, 2015

(30) Foreign Application Priority Data

Sep. 5, 2013   (JP) .................. 2013-183957

(51) Int. Cl.
*G06F 1/00*   (2006.01)
*G06F 1/32*   (2006.01)

(52) U.S. Cl.
CPC .......... *G06F 1/3284* (2013.01); *G06F 1/3293* (2013.01); *Y02B 60/121* (2013.01); *Y02B 60/1267* (2013.01)

(58) Field of Classification Search
CPC .................................................. G06F 1/3284
(Continued)

(56) References Cited

U.S. PATENT DOCUMENTS

2009/0125739 A1* 5/2009 Satoh .................... G06F 1/3287
                                                713/322
2009/0210732 A1* 8/2009 Aoyagi .............. H04N 1/00885
                                                713/320
(Continued)

FOREIGN PATENT DOCUMENTS

CN      103248494 A    8/2013
JP     2009-294940 A   12/2009
(Continued)

OTHER PUBLICATIONS

Office Action in corresponding Japanese Patent Application No. 2013-183957 dated Jun. 30, 2015, with translation (12 pages).

(Continued)

*Primary Examiner* — Aurel Prifti
(74) *Attorney, Agent, or Firm* — Osha Liang LLP

(57) ABSTRACT

A communication device includes a main controller and a second controller that responds, independently of the main controller, to received data based on a proxy program. The communication device also includes a storage that stores, every time data is received, a combination of attributes of the data and details of a response to the data made by the main controller. The communication device also includes a generating circuit that determines at least one pattern with which a response, independently of the main controller, is possible based on a plurality of combinations stored in the storage to generate the proxy program based on the pattern determined. The communication device also includes an applying circuit that applies the proxy program generated by the generating circuit to the second controller.

22 Claims, 20 Drawing Sheets

(58) Field of Classification Search
USPC .............. 713/320, 322, 168, 323, 324, 300;
358/1.14; 726/13
See application file for complete search history.

(56) References Cited

U.S. PATENT DOCUMENTS

| | | | | |
|---|---|---|---|---|
| 2009/0259868 | A1* | 10/2009 | Katoh | ................ G03G 15/5004 |
| | | | | 713/324 |
| 2010/0235639 | A1* | 9/2010 | Inoue | .................... G06F 1/3203 |
| | | | | 713/168 |
| 2010/0290074 | A1* | 11/2010 | Kuroishi | ............ G03G 15/5004 |
| | | | | 358/1.14 |
| 2011/0060929 | A1* | 3/2011 | Park | ...................... G06F 1/3209 |
| | | | | 713/323 |
| 2011/0078464 | A1* | 3/2011 | Yokomizo | ............. G06F 1/3203 |
| | | | | 713/300 |
| 2012/0224206 | A1 | 9/2012 | Takahashi et al. | |
| 2012/0272083 | A1 | 10/2012 | Fujisawa | |
| 2012/0311692 | A1* | 12/2012 | Ebina | .................. H04L 12/6418 |
| | | | | 726/13 |
| 2013/0198546 | A1* | 8/2013 | Fujisawa | ............... G06F 1/3234 |
| | | | | 713/323 |
| 2014/0298054 | A1* | 10/2014 | Hasui | .................... G06F 1/3243 |
| | | | | 713/320 |

FOREIGN PATENT DOCUMENTS

| | | |
|---|---|---|
| JP | 2012-179788 A | 9/2012 |
| JP | 2012-227829 A | 11/2012 |
| JP | 2013-161122 A | 8/2013 |

OTHER PUBLICATIONS

Office Action in corresponding Chinese Patent Application No. 201410449784.6 dated Jan. 5, 2017, with translation (18 pages).
Office Action issued in corresponding Chinese Application No. 201410449784.6 dated Sep. 30, 2017 (20 pages).

* cited by examiner

| ITEM NAME | VALUE |
|---|---|
| TYPE_1 | a01 |
| PROTOCOL | b01 |
| TYPE_2 | c01 |
| SOURCE PORT NUMBER | |
| DESTINATION PORT NUMBER | |
| COMMAND | f01 |
| PARAMETER | g01 |

5a  5b

| ITEM NAME | VALUE |
|---|---|
| OPERATED DEVICE | PRINTING UNIT |
| CONTENT OF REPLY | h01 |

5a

52 (5)

| ITEM NAME | VALUE |
|---|---|
| TYPE_1 | a01 |
| PROTOCOL | b02 |
| TYPE_2 | |
| SOURCE PORT NUMBER | d02 |
| DESTINATION PORT NUMBER | e02 |
| COMMAND | f02 |
| PARAMETER | g02 |

5a  5b

| ITEM NAME | VALUE |
|---|---|
| OPERATED DEVICE | |
| CONTENT OF REPLY | h02 |

5a

53 (5)

| ITEM NAME | VALUE |
|---|---|
| TYPE_1 | a01 |
| PROTOCOL | b02 |
| TYPE_2 | |
| SOURCE PORT NUMBER | d02 |
| DESTINATION PORT NUMBER | e02 |
| COMMAND | f02 |
| PARAMETER | g02 |

5a  5b

| ITEM NAME | VALUE |
|---|---|
| OPERATED DEVICE | |
| CONTENT OF REPLY | h03 |

| ITEM NAME | VALUE |
|---|---|
| TYPE_1 | a01 |
| PROTOCOL | b03 |
| TYPE_2 | |
| SOURCE PORT NUMBER | d03 |
| DESTINATION PORT NUMBER | e03 |
| COMMAND | f03 |
| PARAMETER | g03 |

5a  5b

| ITEM NAME | VALUE |
|---|---|
| OPERATED DEVICE | |
| CONTENT OF REPLY | h04 |

55 (5)

| ITEM NAME | VALUE |
|---|---|
| TYPE_1 | a01 |
| PROTOCOL | b03 |
| TYPE_2 | |
| SOURCE PORT NUMBER | d03 |
| DESTINATION PORT NUMBER | e03 |
| COMMAND | f03 |
| PARAMETER | g03 |

5a  5b

| ITEM NAME | VALUE |
|---|---|
| OPERATED DEVICE | |
| CONTENT OF REPLY | h04 |

56 (5)

| ITEM NAME | VALUE |
|---|---|
| TYPE_1 | a01 |
| PROTOCOL | b03 |
| TYPE_2 | |
| SOURCE PORT NUMBER | d04 |
| DESTINATION PORT NUMBER | e03 |
| COMMAND | f03 |
| PARAMETER | g03 |

5a  5b

| ITEM NAME | VALUE |
|---|---|
| OPERATED DEVICE | |
| CONTENT OF REPLY | h04 |

57 (5)

| ITEM NAME | VALUE |
|---|---|
| TYPE_1 | a01 |
| PROTOCOL | b03 |
| TYPE_2 | |
| SOURCE PORT NUMBER | d04 |
| DESTINATION PORT NUMBER | e03 |
| COMMAND | f03 |
| PARAMETER | g03 |

5a  5b

| ITEM NAME | VALUE |
|---|---|
| OPERATED DEVICE | |
| CONTENT OF REPLY | h04 |

FIG. 9

| ITEM NAME | VALUE |
|---|---|
| TYPE_1 | a01 |
| PROTOCOL | b01 |
| TYPE_2 | |
| SOURCE PORT NUMBER | d05 |
| DESTINATION PORT NUMBER | e05 |
| COMMAND | f05 |
| PARAMETER | g05 |

5a  5b

| ITEM NAME | VALUE |
|---|---|
| OPERATED DEVICE | |
| CONTENT OF REPLY | h05 |

58 (5)

| ITEM NAME | VALUE |
|---|---|
| TYPE_1 | a01 |
| PROTOCOL | b01 |
| TYPE_2 | |
| SOURCE PORT NUMBER | d05 |
| DESTINATION PORT NUMBER | e05 |
| COMMAND | f05 |
| PARAMETER | g05 |

5a  5b

| ITEM NAME | VALUE |
|---|---|
| OPERATED DEVICE | |
| CONTENT OF REPLY | h05 |

| ITEM NAME | VALUE |
|---|---|
| TYPE_1 | a01 |
| PROTOCOL | b03 |
| DESTINATION PORT NUMBER | e03 |
| COMMAND | f03 |
| PARAMETER | g03 |

| ITEM NAME | VALUE |
|---|---|
| TYPE_1 | a01 |
| PROTOCOL | b01 |
| TYPE_2 | |
| SOURCE PORT NUMBER | d05 |
| DESTINATION PORT NUMBER | e05 |
| COMMAND | f05 |
| PARAMETER | g05 |

62 (6)

COMMUNICATION DEVICE INCLUDING TWO CONTROLLERS, A METHOD FOR CUSTOMIZING THE SAME, AND COMPUTER-READABLE STORAGE MEDIUM FOR COMPUTER PROGRAM

This application is based on Japanese patent application No. 2013-183957 filed on Sep. 5, 2013, the contents of which are hereby incorporated by reference.

BACKGROUND OF THE INVENTION

1. Field of the Invention

The present invention relates to a technology for achieving power savings in a device for performing communication.

2. Description of the Related Art

In recent years, power savings in various devices have been in progress. As an example of technologies for such power savings, a technology comes into widespread use by which supply of electricity to a part of hardware of a device is temporarily limited.

Such technologies are used also in an image forming apparatus into which functions of copying, PC printing, faxing, scanning, box function, and so on are consolidated. Such an image forming apparatus is usually called an "MFP" or a "multifunction device".

Limiting the supply of electricity, however, sometimes affects the operation. To cope with this, the following method has been proposed.

An MFP is provided with an automatic response unit, an analysis unit, a message generation unit, and a transmitting/receiving unit. The automatic response unit switches the mode from a power-saving mode to a normal mode based on a protocol requested by a PC. The analysis unit analyzes whether or not the PC is in a state of requesting the protocol for switching the mode from the power-saving mode to the normal mode without executing a job. The message generation unit generates, when the analysis unit detects the state, a message for changing the protocol the PC has. The transmitting/receiving unit transmits the generated message. Thereby, it is possible to reduce the possibility that the mode is switched from the power-saving mode to the normal mode for the case where a request not directly related to printing is received (Japanese Laid-open Patent Publication No. 2012-179788).

The following method has also been proposed. An image processor having a first power mode and a second power mode whose power consumption is smaller than that of the first power mode, includes: a first control part for controlling the entirety of the device; and a second control part to which power is supplied in the first power mode and the second power mode, and then, performs security communication with an external device. The first control part selects security-related information to be reported to the second control part among a plurality of pieces of security-related information stored in a storage part for storing the plurality of pieces of security-related information associated with the security communication when the first power mode is shifted to the second power mode (Japanese Laid-open Patent Publication No. 2012-227829).

Further, another technology has been proposed in which, in a power-saving mode, a sub CPU is used to respond to a part of received packets without the use of a main CPU.

According to the conventional technologies, it is necessary to arrange, at the design stage of a device, whether a main CPU performs processing for responding to received packets or whether a sub CPU performs the processing in place of the main CPU.

In recent years, a variety of protocols have been used in networks. In what way such protocols are used is varied and may be changed. There is a variety of network configurations, and the configurations may be changed. Accordingly, which of the main CPU and the sub CPU should respond to received packets may change while the device is used.

SUMMARY

The present invention has been achieved in light of such an issue, and an object thereof is to make a CPU (controller) acting as a substitute for another perform response processing more flexibly and precisely than is conventionally possible.

According to one aspect of the present invention, a communication device including a first controller functioning as a main controller and a second controller which responds to received data based on a proxy program independently of the first controller is provided. The communication device includes a storage portion configured to store, every time data is received, a combination of attributes of the data and details of a response to the data made by the first controller; a generating portion configured to determine at least one pattern with which a response independently of the first controller is possible based on a plurality of the combinations stored in the storage portion to generate the proxy program based on the pattern determined; and an applying portion configured to apply the proxy program generated by the generating portion to the second controller.

These and other characteristics and objects of the present invention will become more apparent by the following descriptions of preferred embodiments with reference to drawings.

BRIEF DESCRIPTION OF THE DRAWINGS

FIG. 7 is a diagram showing an example of normal-time record data.

FIG. 8 is a diagram showing an example of normal-time record data.

FIG. 9 is a diagram showing an example of normal-time record data.

FIGS. 12A and 12B are diagrams showing an example of property data.

DESCRIPTION OF THE PREFERRED EMBODIMENTS

Figure 1:
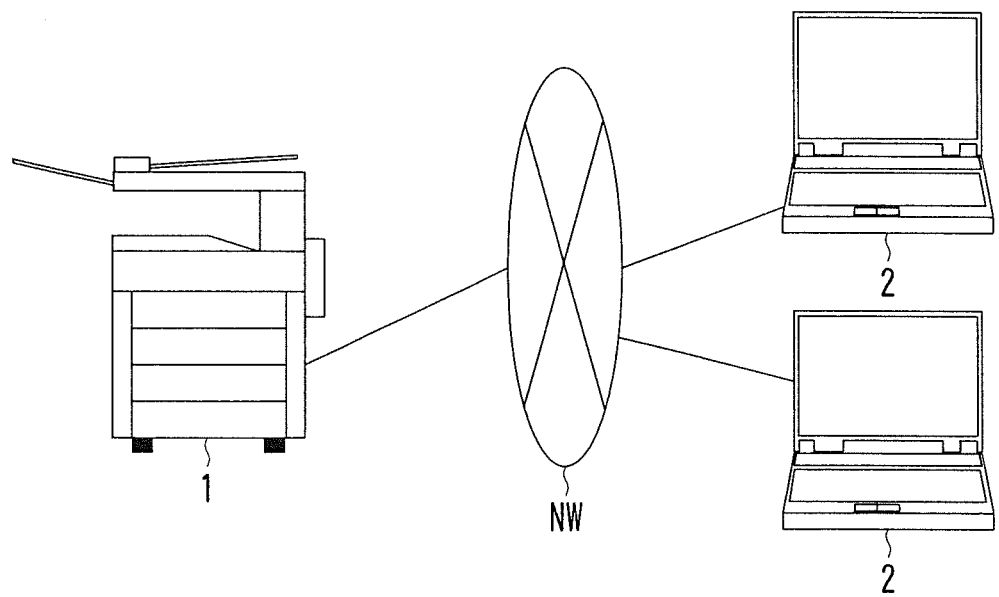
FIG. 1 is a diagram showing an example of the overall configuration of a network system.
Figure 2:
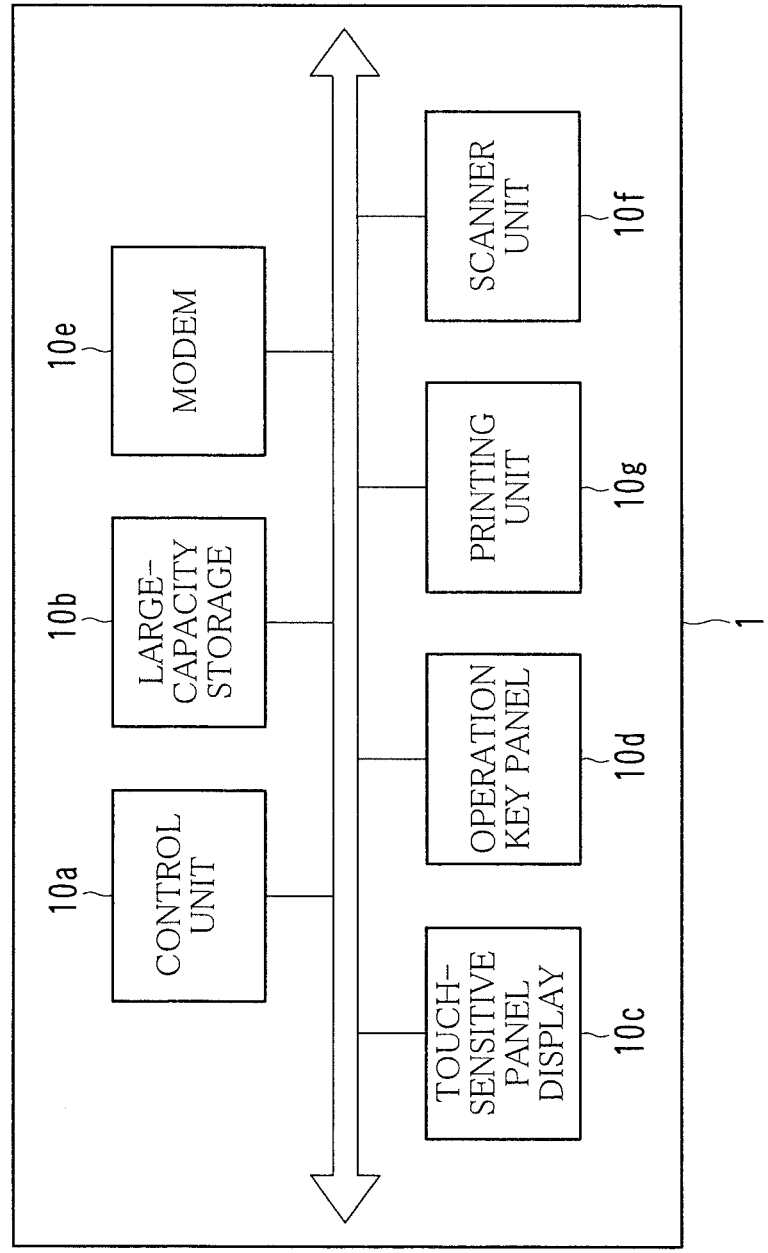
FIG. 2 is a diagram showing an example of the hardware configuration of an image forming apparatus.
Figure 3:
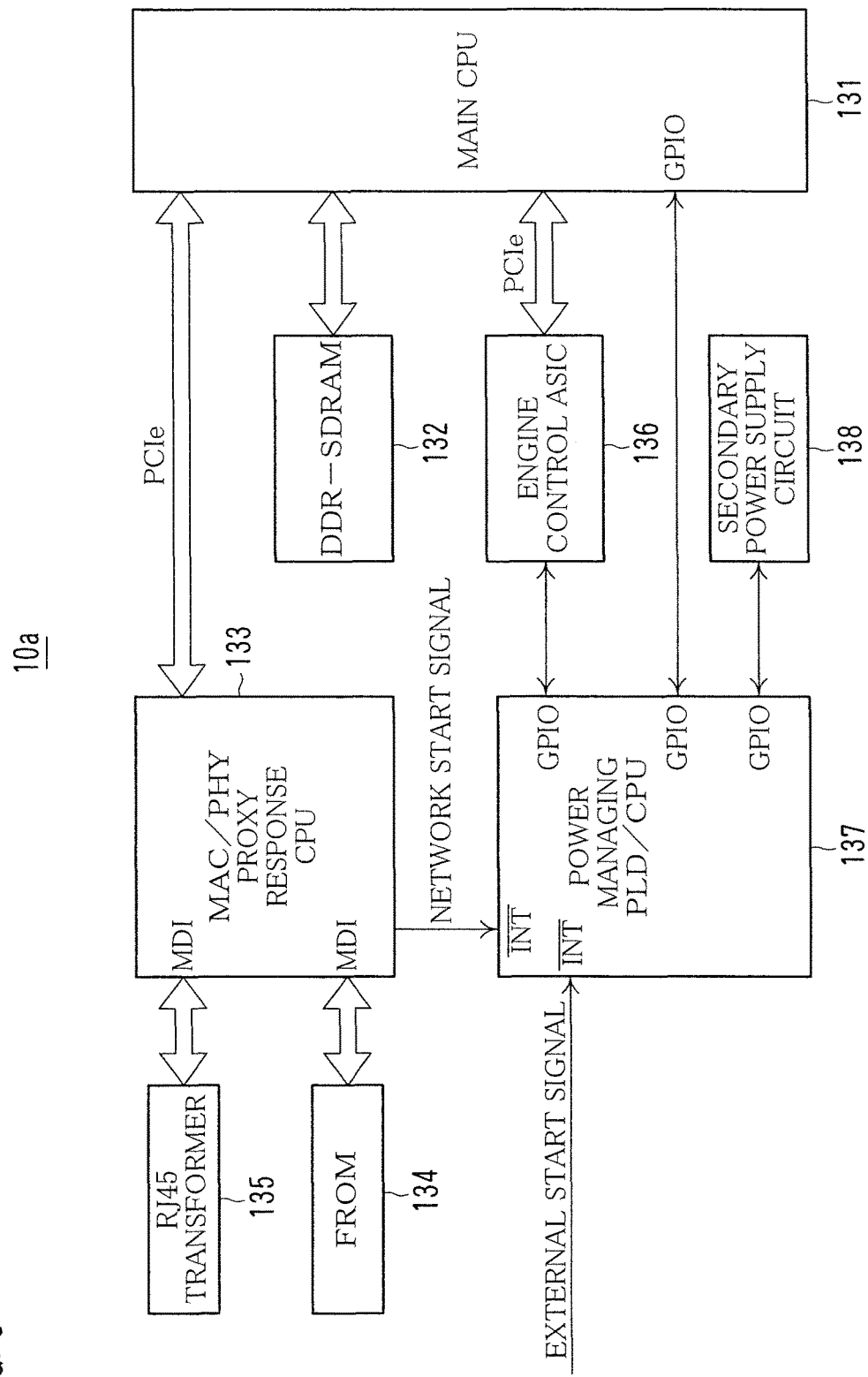
FIG. 3 is a diagram showing an example of the hardware configuration of a control unit.
Figure 4:
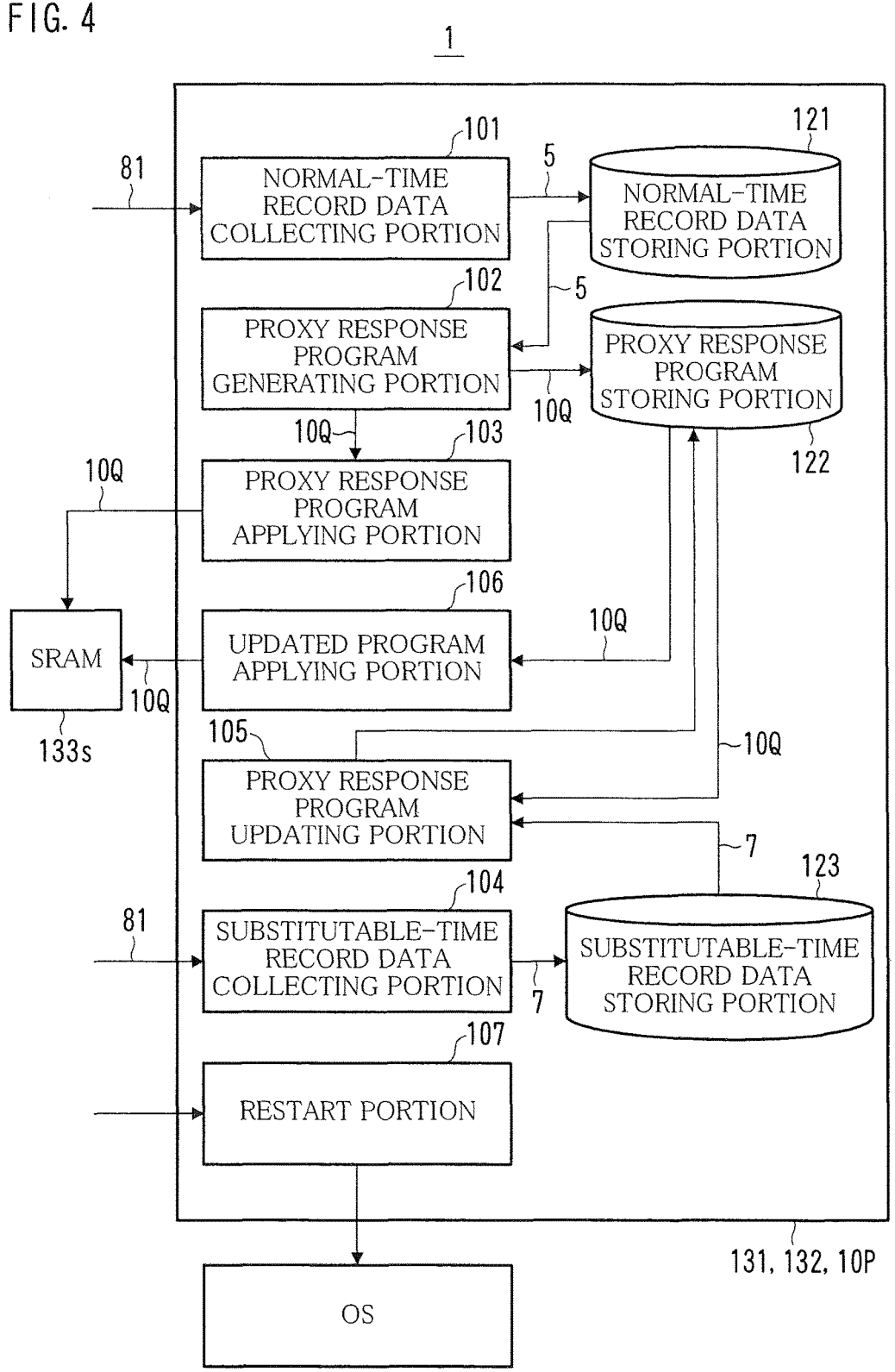
FIG. 4 is a diagram showing an example of the functional configuration of an image forming apparatus.

FIG. 1 is a diagram showing an example of the overall configuration of a network system 3. FIG. 2 is a diagram showing an example of the hardware configuration of an image forming apparatus 1. FIG. 3 is a diagram showing an example of the hardware configuration of a control unit 10a. FIG. 4 is a diagram showing an example of the functional configuration of the image forming apparatus 1.

Referring to FIG. 1, the network system 3 is configured of the image forming apparatus 1, at least one terminal 2, a communication line NW, and so on.

The image forming apparatus 1 is an apparatus into which functions such as copying, PC printing, faxing, scanning, and box function are consolidated. The image forming apparatus 1 is sometimes called a "multifunction device", a "Multi-Functional Peripheral (MFP)", or the like.

The PC printing function is to print an image onto paper based on image data received from the terminal 2 which belongs to the same segment as that of the image forming apparatus 1. The PC printing function is sometimes called "network printing" or "network print".

According to the box function, a storage area called a "box" or "personal box" is allocated to each user. The box function enables each user to save data such as image data to his/her storage area and to manage the same therein. The box corresponds to a "folder" or "directory" in a personal computer.

Referring to FIG. 2, the image forming apparatus 1 is configured of the control unit 10a, a large-capacity storage 10b, a touch-sensitive panel display 10c, an operation key panel 10d, a modem 10e, a scanner unit 10f, a printing unit 10g, and so on.

The touch-sensitive panel display 10c displays, for example, a screen for presenting messages to a user, a screen for allowing a user to enter commands or information, and a screen for showing the results of processing. The touch-sensitive panel display 10c sends a signal indicating a touch position to a main CPU 131 (see FIG. 3) of the control unit 10a.

The operation key panel 10d is a so-called hardware keyboard, and is provided with a numeric keypad, a start key, a stop key, and a function key.

The modem 10e sends and receives image data with a facsimile terminal in accordance with a protocol such as G3.

The scanner unit 10f optically reads an image recorded on a sheet placed on a platen glass, and generates image data thereof.

The printing unit log prints an image onto paper based on image data received from other devices. The printing unit 10g prints, onto paper, an image captured by the scanner unit 10f.

The large-capacity storage 10b has installed, therein, software for implementing the foregoing functions, e.g., an operating system and an application. The large-capacity storage 10b has also installed therein a customizer program 10P.

The customizer program 10P is used to make settings as to how to handle packets received while the image forming apparatus 1 is put in a sleep mode or in a standby mode, which is discussed later.

Referring to FIG. 3, the control unit 10a is configured of a main Central Processing Unit (CPU) 131, a Double Data Rate Synchronous Dynamic Random Access Memory (DDR-SDRAM) 132, a proxy response CPU 133, a flash ROM 134, a Registered Jack (RJ) transformer 135, an engine control Application Specific Integrated Circuit (ASIC) 136, a power managing CPU 137, a secondary power supply circuit 138, and so on. By virtue of the configuration, the control unit 10a controls the image forming apparatus 1.

The DDR-SDRAM 132 is a work memory for the main CPU 131. A program or module is loaded into the DDR-SDRAM 132 from the large-capacity storage 10b. Data obtained from other devices or computational results are stored into the DDR-SDRAM 132.

The main CPU 131 executes the program and module loaded into the DDR-SDRAM 132. Basically, the customizer program 10P stays resident in the DDR-SDRAM 132, and is always executed by the main CPU 131.

The proxy response CPU 133 is to perform so-called Internet Protocol (IP) communication. In particular, the proxy response CPU 133 performs processing for a physical layer and a data link layer (Media Access Control (MAC) sub layer). Further, when data is received from another device for the case where the image forming apparatus 1 is put in the sleep mode or the standby mode (discussed later), if possible, the proxy response CPU 133 responds to the data in place of the main CPU 131. Hereinafter, responding to received data in place of the main CPU 131 is referred to as a "proxy response".

The flash ROM 134 stores, therein, programs and data for the proxy response CPU 133 to execute processing.

The proxy response CPU 133 has a Static RAM (SRAM) built therein, and stores a proxy response program 10Q for proxy response therein. The proxy response program 10Q is generated by the main CPU 131 based on the customizer program 10P as described later.

The RJ transformer 135 is a pulse transformer for Local Area Network (LAN).

The engine control ASIC 136 is to control the printing unit 10g.

The secondary power supply circuit 138 supplies power to each piece of the hardware. The power managing CPU 137 controls the secondary power supply circuit 138 to adjust the supply of power to each piece of the hardware.

For the image forming apparatus 1, there are prepared three power supply modes, namely, a normal mode, a sleep mode, and a standby mode.

In the normal mode, power is supplied to all pieces of the hardware in such a manner that basically any processing is executed promptly.

In the standby mode, power is supplied in such a manner that computing operation by the main CPU 131 is executed promptly while the power consumption is reduced by stopping displaying an image on the touch-sensitive panel display 10c, or stopping idle running of the printing unit 10g. Therefore, when the image forming apparatus 1 is put in the standby mode, power is supplied to, in particular, the main CPU 131 among the processors and memories of the control unit 10a.

In the sleep mode, the supply of power to the main CPU 131 is stopped to further reduce the power consumption as compared to the case of the standby mode. Supplying power to the DDR-SDRAM 132 may be continued or stopped. If the supply of power thereto is stopped, the programs and data stored in the DDR-SDRAM 132 are backed up in advance on the large-capacity storage 10b. Before the sleep mode is turned into the normal mode, the programs and data are loaded into the DDR-SDRAM 132. The same is also applied to the flash ROM 134.

The description goes on to the settings as to how to handle packets received when the image forming apparatus 1 is put in the sleep mode or in the standby mode.

The customizer program 10P implements the functions of a normal-time record data collecting portion 101, a proxy response program generating portion 102, a proxy response program applying portion 103, a substitutable-time record data collecting portion 104, a proxy response program updating portion 105, an updated program applying portion 106, a restart portion 107, a normal-time record data storing portion 121, a proxy response program storing portion 122, a substitutable-time record data storing portion 123, and so on, all of which are shown in FIG. 4.

The functions of the portions shall be described below, the descriptions being broadly divided into a function to generate a proxy response program and a function to update the proxy response program.

[Function to Generate Proxy Response Program]

Figure 5:
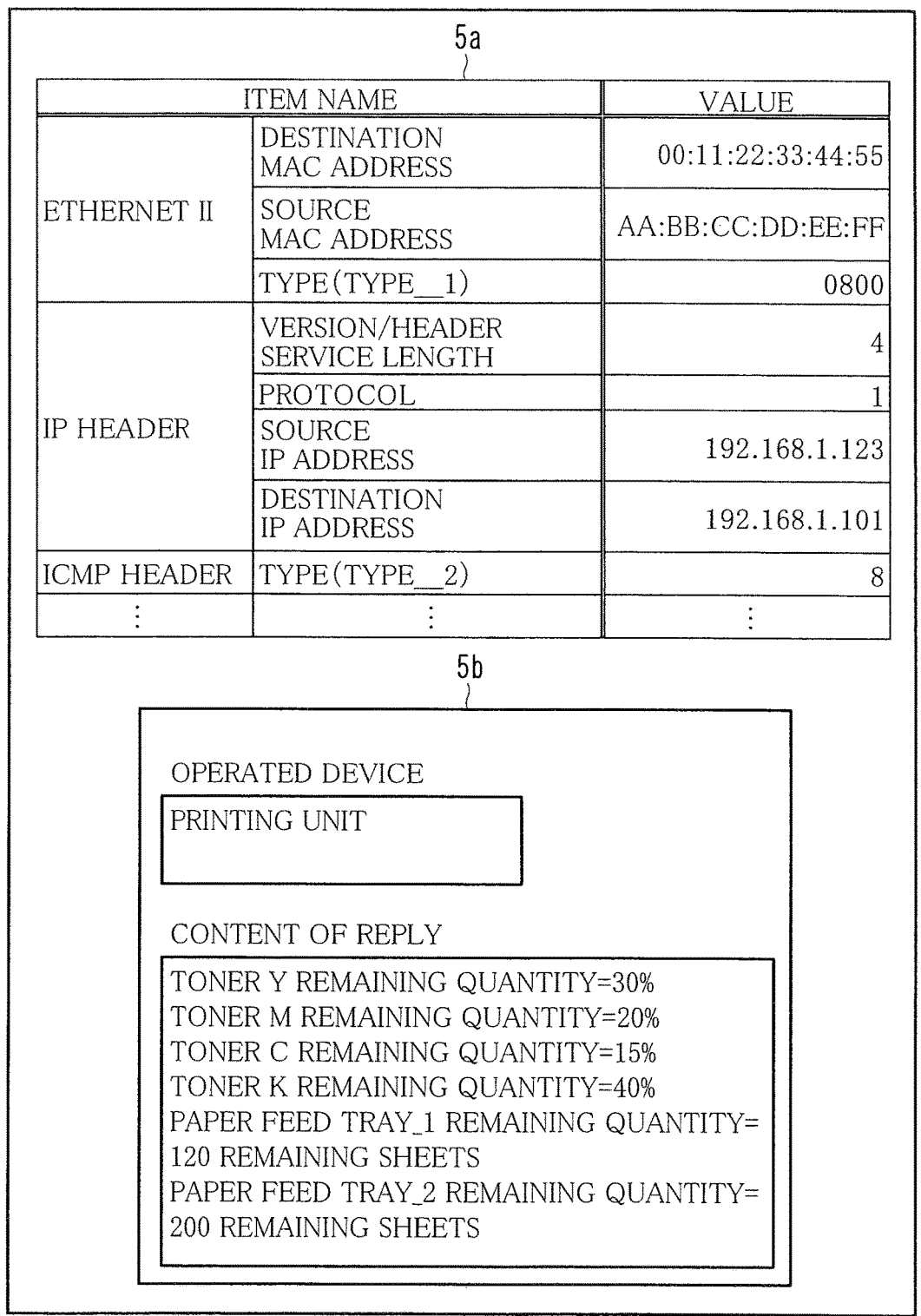
FIG. 5 is a diagram showing an example of normal-time record data.
Figure 6A:
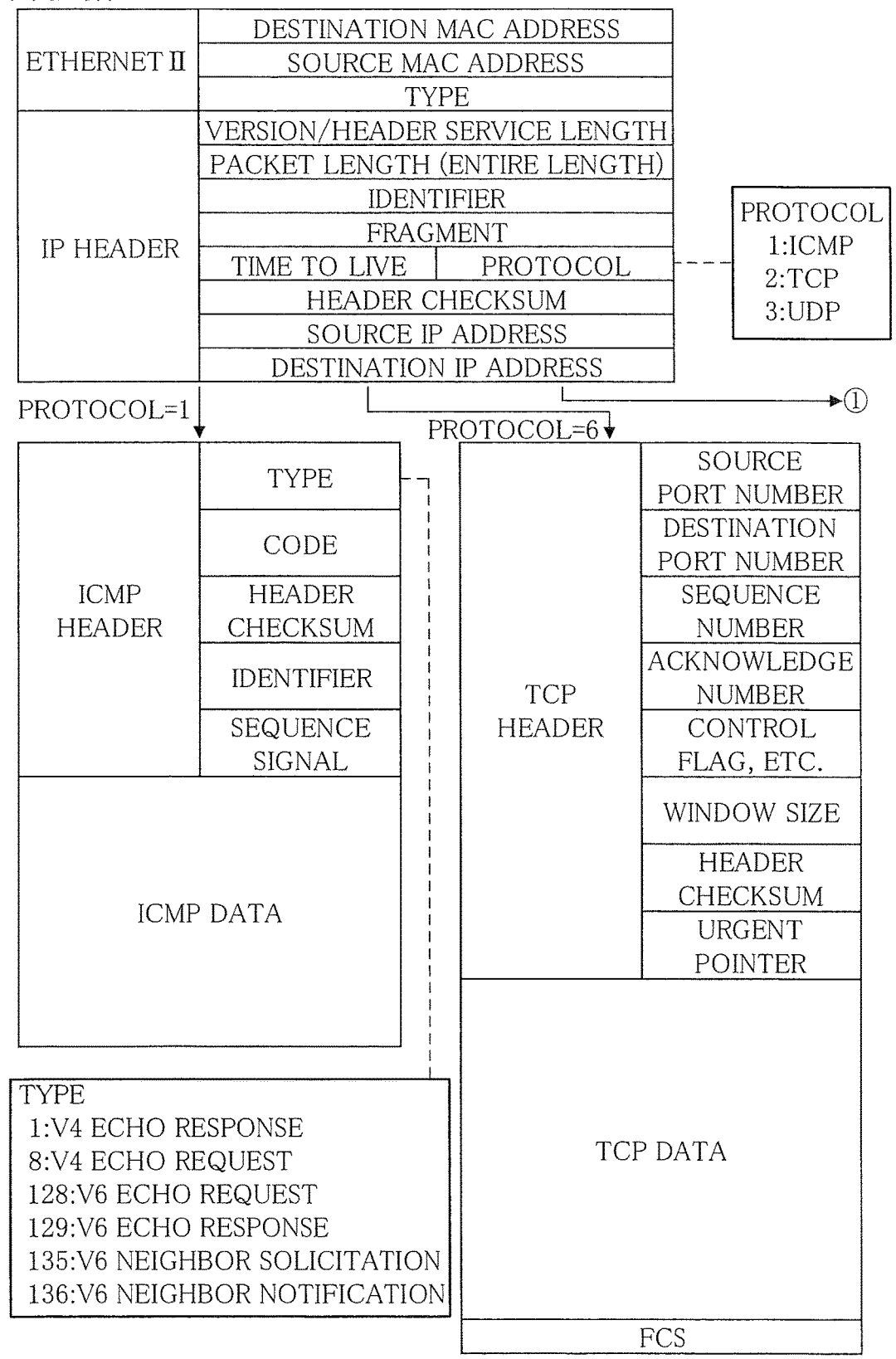
FIGS. 6A and 6B are diagrams showing an example of the standard structure of a packet.
Figure 6B:
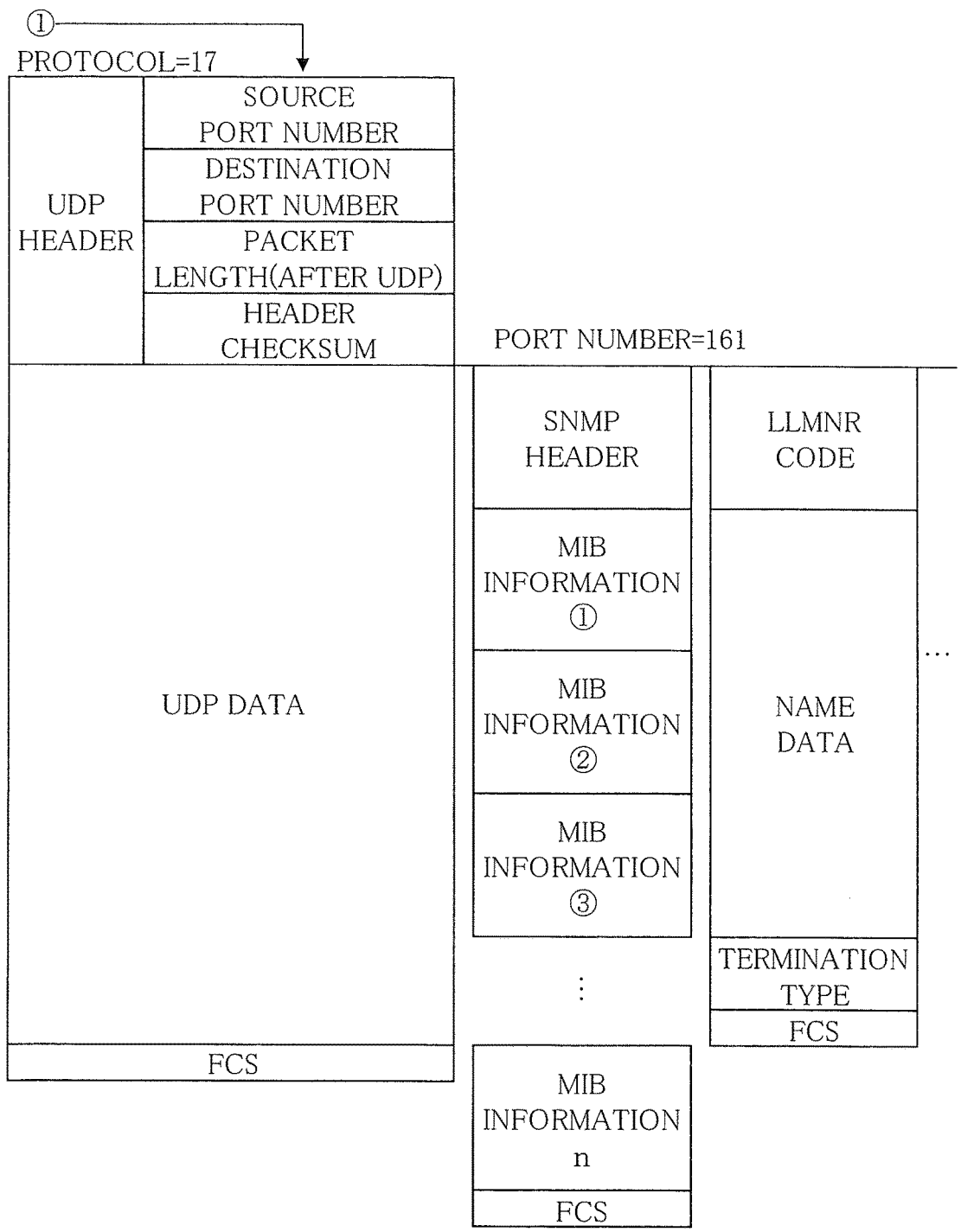
Figure 10:
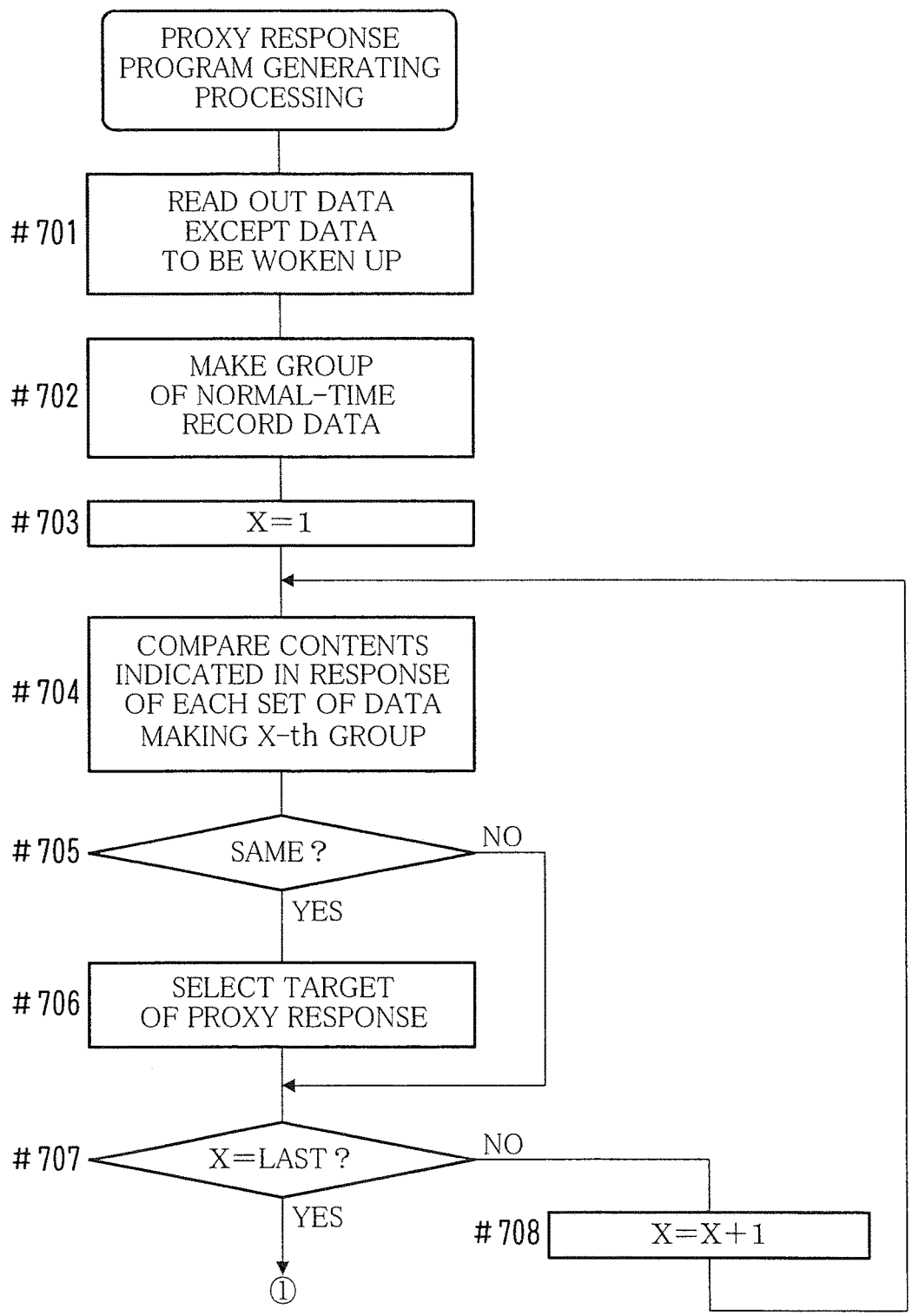
FIG. 10 is a flowchart depicting an example of the flow of processing for generating a proxy response program.
Figure 11:
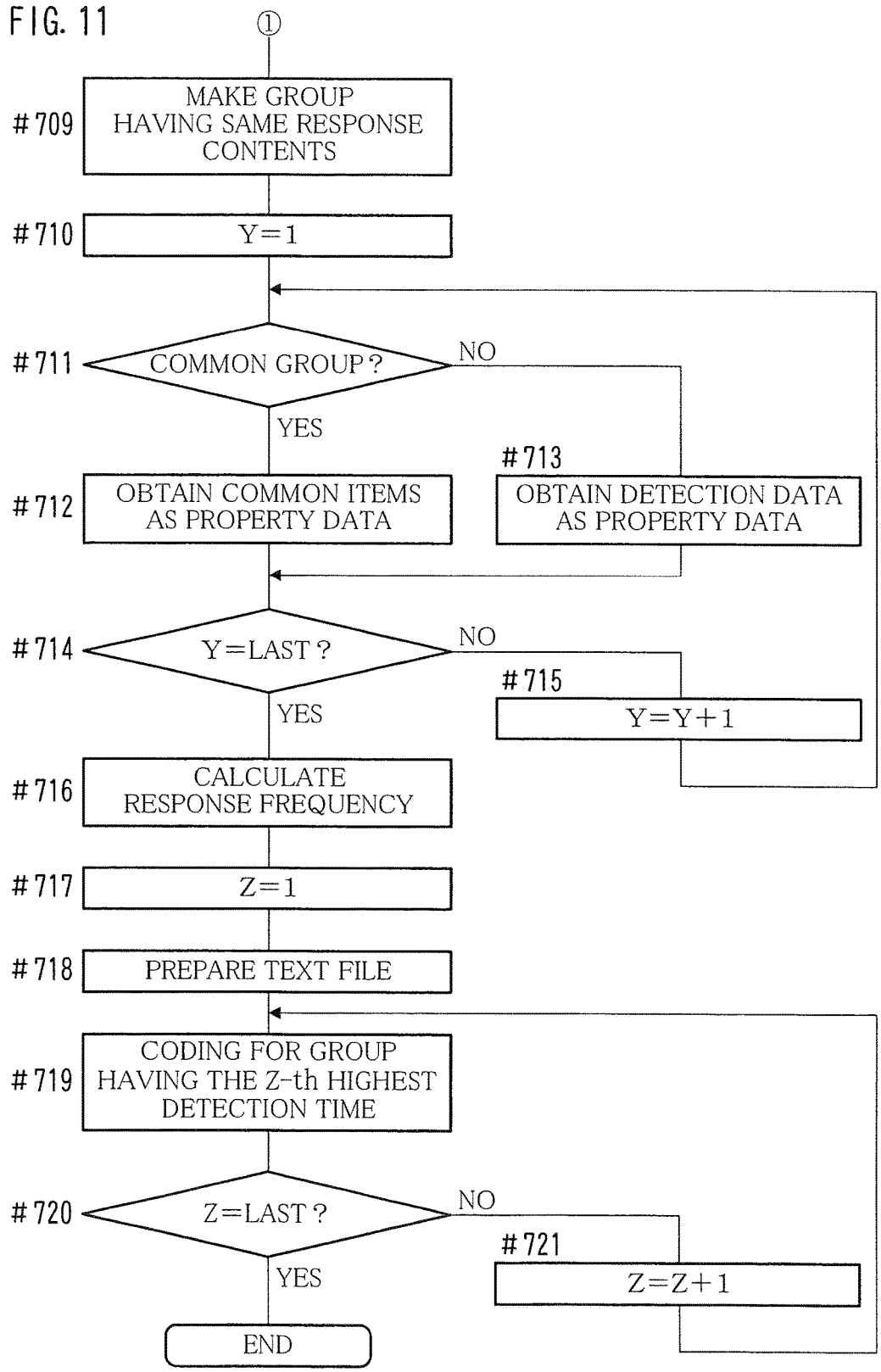
FIG. 11 is a flowchart depicting an example of the flow of processing for generating a proxy response program.
Figure 13:
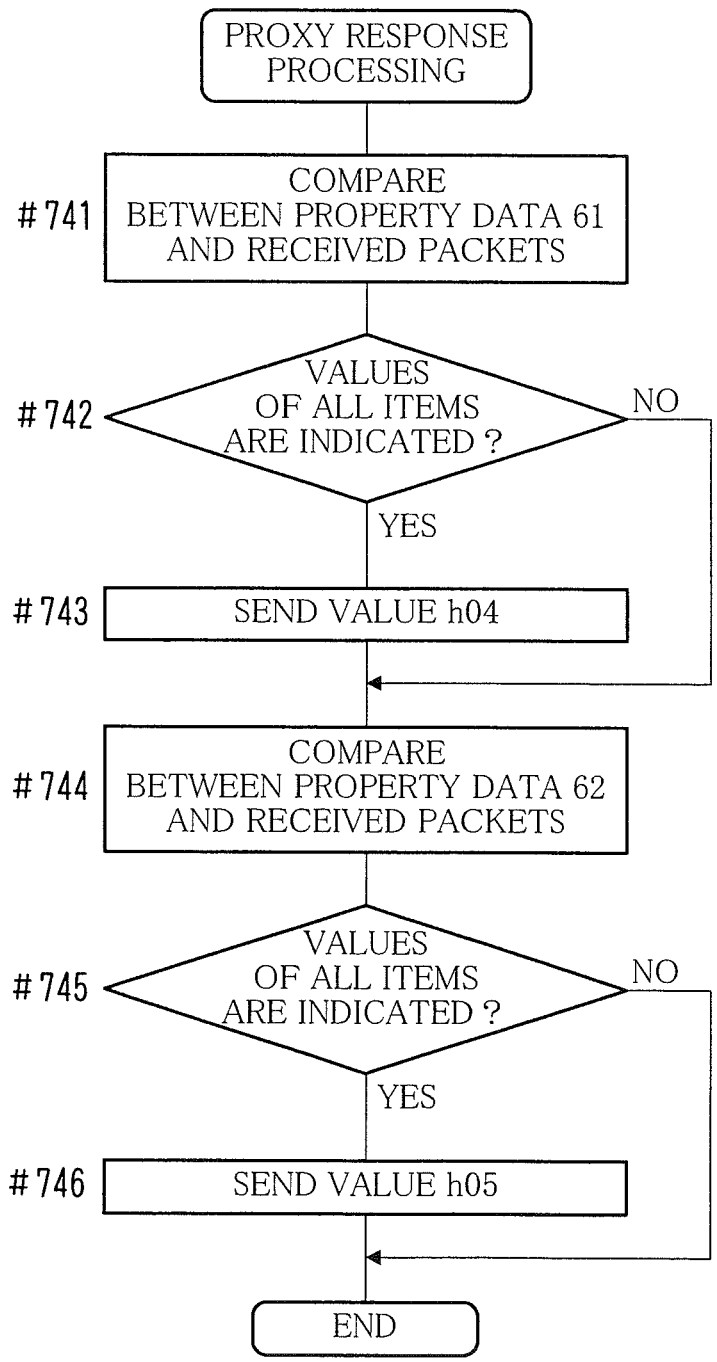
FIG. 13 is a flowchart depicting an example of the flow of proxy response processing.
Figure 14:
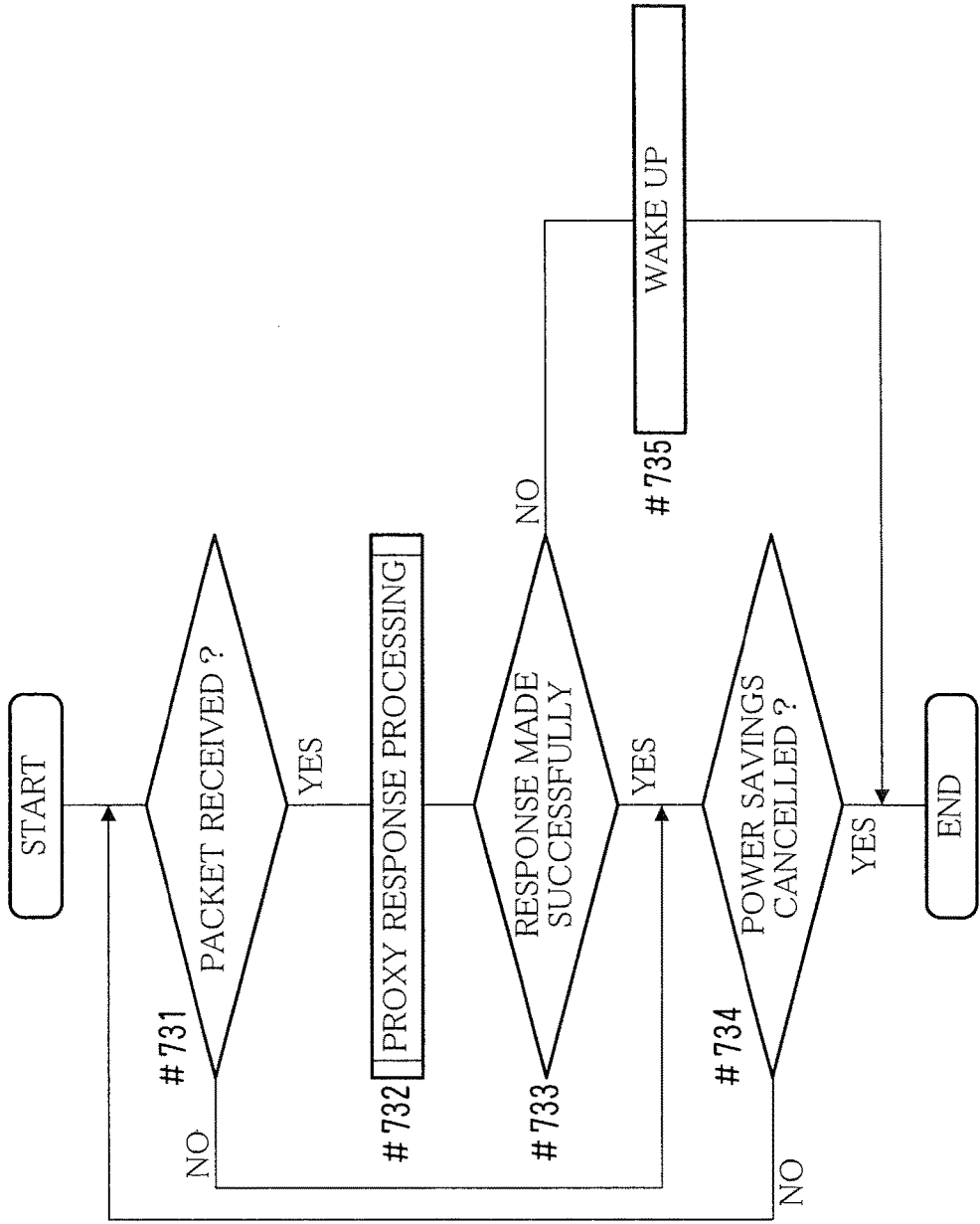
FIG. 14 is a flowchart depicting an example of the flow of the entire processing performed by a proxy response CPU.

FIG. 5 is a diagram showing an example of normal-time record data 5. FIGS. 6A and 6B are diagrams showing an example of the standard structure of a packet. FIG. 7 is a diagram showing an example of normal-time record data 51-53. FIG. 8 is a diagram showing an example of normal-time record data 54-57. FIG. 9 is a diagram showing an example of normal-time record data 58 and 59. FIGS. 10 and 11 are flowcharts depicting an example of the flow of processing for generating a proxy response program. FIGS. 12A and 12B are diagrams showing an example of property data 61 and 62. FIG. 13 is a flowchart depicting an example of the flow of proxy response processing. FIG. 14 is a flowchart depicting an example of the flow of the entire processing performed by the proxy response CPU 133.

The normal-time record data collecting portion 101 performs processing for collecting the normal-time record data 5 as that shown in FIG. 5 during a predetermined period of time Tp in the following manner.

The normal-time record data collecting portion 101 changes the power supply mode to the normal mode. The normal-time record data collecting portion 101 maintains the normal mode active during a period of time when collecting the normal-time record data 5.

In the meantime, packets delivered to the image forming apparatus 1 from another device via the communication line NW are structured based on a predetermined format. The following description takes an example where a packet is structured based on a Mac frame format as shown in FIGS. 6A and 6B.

When receiving a packet 81 (MAC frame), the normal-time record data collecting portion 101 extracts, from the packet 81, the following information. The normal-time record data collecting portion 101 extracts, from the MAC header of the packet 81, a destination MAC address, a source MAC address, and a type.

The normal-time record data collecting portion 101 further extracts, in accordance with the extracted type, information on predetermined items. For example, when the type corresponds to "IP", the normal-time record data collecting portion 101 extracts, from an IP header of the packet 81, a version/header service length, a protocol, a source IP address, and a destination IP address.

The normal-time record data collecting portion 101 further extracts, in accordance with the extracted protocol, information on predetermined items. For example, when the protocol is an Internet Control Message Protocol (ICMP), the normal-time record data collecting portion 101 extracts a type from an ICMP header of the packet 81. When the ICMP data contains a predetermined command, the normal-time record data collecting portion 101 further extracts the command. When the command has a parameter, the parameter is also extracted together with the command.

Alternatively, when the protocol is a Transmission Control Protocol (TCP), the normal-time record data collecting portion 101 extracts a source port number and a destination port number from the TCP header of the packet 81. When the TCP data contains a predetermined command, the normal-time record data collecting portion 101 further extracts the command. When the command has a parameter, the parameter is also extracted together with the command.

Yet alternatively, when the protocol is a User Datagram Protocol (UDP), the normal-time record data collecting portion 101 extracts a source port number and a destination port number from the UDP header of the packet 81. When the UDP data contains a predetermined command, the normal-time record data collecting portion 101 further extracts the command. When the command has a parameter, the parameter is also extracted together with the command.

The normal-time record data collecting portion 101 generates detection data 5a indicating the pieces of information extracted from the packet 81.

The normal-time record data collecting portion 101 further generates response data 5b. The response data 5b indicates the content of processing performed by the image forming apparatus 1 in response to the receipt of the packet 81. Hereinafter, such processing is referred to as "response processing".

To be specific, when the hardware used for the response processing (hereinafter, such hardware referred to as an "operated device") is specific hardware, the hardware is indicated in the response data 5b. The specific hardware is one which can operate only when the image forming apparatus 1 is put in the normal mode. In this embodiment, each of the modem 10e, the scanner unit 10f, and the printing unit 10g is set as the specific hardware.

If the response processing includes processing for sending data, in return, to the transmission source of the packet 81, the response data 5b also indicates the content of reply. For example, the response data 5b indicates attributes concerning communication in the image forming apparatus 1 (IP address and MAC address, for example). Alternatively, the response data 5b indicates the remaining quantity of consumables (toner, paper, and so on) in the image forming apparatus 1.

The normal-time record data collecting portion 101 causes the normal-time record data storing portion 121 to store therein, as the normal-time record data 5, data containing the detection data 5a and the response data 5b.

During the predetermined period of time Tp, every time receiving a packet, the normal-time record data collecting portion 101 generates normal-time record data 5 to cause the normal-time record data storing portion 121 to store the normal-time record data 5 therein. Thereby, data indicating a record of the response processing performed during the predetermined period of time Tp is accumulated into the normal-time record data storing portion 121. The predetermined period of time Tp may be set to have any length; however, preferably to have a length from a few days to approximately one month.

After the predetermined period of time Tp has elapsed, the proxy response program generating portion 102 generates the proxy response program 10Q. Hereinafter, the processing procedure of generating the proxy response program 10Q is described with reference to the flowcharts of FIGS. 10 and 11, by taking an example in which the normal-time record data 5 shown in FIGS. 7-9 is obtained.

FIGS. 7-9 illustrate nine sets of normal-time record data 51-59 as the normal-time record data 5. For simplicity of explanation, values of items are represented in an abstract manner such as "a01", "b01", "c01", and so on. In actuality, the concrete values of "00:11:22:33:44:55" and "0800" are indicated as shown in FIG. 5. Some items such as "content of reply" indicate a plurality of values. In FIGS. 7-9, however, one abstract character string such as "h01", "h02", or the like is indicated in the items. In a plurality of sets of normal-time record data 5, one same character string is indicated in an item where a plurality of values may be indicated. This means that the values are equal to one another. If even one value is different from the other values, different character strings are indicated.

The proxy response program generating portion 102 reads out, in the plurality of sets of the normal-time record data 5 stored in the normal-time record data storing portion 121, normal-time record data 5 in which no specific hardware is indicated as the hardware used for the response processing (Step #701 of FIG. 10). As described earlier, the specific hardware is one which can operate only in the normal mode, in other words, one which needs to be woken up in the sleep mode or the standby mode. The specific hardware is, for example, the modem 10e, the scanner unit 10f, or the printing unit 10g.

In the examples of FIGS. 7-9, the normal-time record data 52-59 are read out. The normal-time record data 51, however, is not read out.

The proxy response program generating portion 102 makes a group of the normal-time record data 5 thus read out (Step #702 of FIG. 10). For example, the proxy response program generating portion 102 makes a group of the normal-time record data 5 in which all the values of the items are common to each other.

In the examples of FIGS. 7-9, the proxy response program generating portion 102 makes a group of the normal-time record data 52 and 53 (hereinafter, the group is referred to as a "group_G1"). The proxy response program generating portion 102 makes a group of the normal-time record data 54 and 55 (hereinafter, the group is referred to as a "group_G2"). The proxy response program generating portion 102 makes a group of the normal-time record data 56 and 57 (hereinafter, the group is referred to as a "group_G3"). The proxy response program generating portion 102 makes a group of the normal-time record data 58 and 59 (hereinafter, the group is referred to as a "group_G4").

The proxy response program generating portion 102 makes a first group as a target (Step #703). The proxy response program generating portion 102 compares the contents indicated in the response data 5b of each set of the normal-time record data 5 making the first group (Step #704). If the contents are the same as one another (Yes in Step #705), then the first group is selected as a target of proxy response (Step #706).

If a plurality of groups is made in Step #702, with respect to the remaining groups, the proxy response program generating portion 102 compares the contents of the response data 5b (Step #704). If the contents are the same as one another (Step #705), then the proxy response program generating portion 102 performs the processing for selecting a target of proxy response (Step #706-Step #708).

In the examples of FIGS. 7-9, the group_G1 is not selected as the target because the contents indicated in the response data 5b of the members (normal-time record data 52 and 53) differ from each other. The reason why the group_G1 is not selected is as follows: Even if the same inquiry is sent from different devices, the response contents are sometime different, which makes it difficult for the proxy response CPU 133 to respond to the inquiry. In contrast, the group_G2 is selected as the target because the contents indicated in the response data 5b of the members (normal-time record data 54 and 55) are the same as each other. Due to the same reason, both the group_G3 and the group_G4 are selected.

The proxy response program generating portion 102 optimizes the selected groups as follows. Among the selected groups, groups having the same contents of the response data 5b are made into a common group (Step #709 of FIG. 11).

Referring to the examples of FIGS. 7-9, the response data 5b of the members of the group_G2 indicate the same values as those of the response data 5b of the members of the group_G3. The group_G2 and the group_G3 are therefore made into a common group. Hereinafter, the common group is referred to as a "common group_K1".

The proxy response program generating portion 102 performs processing for obtaining the property data 6 for the common group and the property data 6 for groups that were not made into the common group (hereinafter, referred to as a "non-common group") in the following manner.

As for the common group (Yes in Step #711), the proxy response program generating portion 102 obtains, as the property data 6, from the detection data 5a of each group made into the common group, items having the same value and the value (Step #712).

By this processing, as the property data 6 for the common group_K1, property data 61 is obtained which indicates items other than the source port number, e.g., items of type_1, protocol, type_2, destination port number, command, and parameter, and values thereof as shown in FIG. 12A.

On the other hand, as for the non-common group (No in Step #711), the proxy response program generating portion 102 obtains the response data 5b of the non-common group as the property data 6 for the non-common group (Step #713).

For example, the proxy response program generating portion 102 obtains, as the property data 6 for the group_G4, the response data 5b of the normal-time record data 58 (or the normal-time record data 59). Thereby, the property data 62 as that shown in FIG. 12B is obtained as the property data 6 for the group_G4.

In parallel with the processing for obtaining the property data 6 or before or after the same, the proxy response program generating portion 102 calculates a response frequency RT by dividing the number of sets of normal-time record data 5 which are members of each group (common group or non-common group) by the predetermined period of time Tp (Step #716).

The proxy response program generating portion 102 performs the following coding based on the response data 5b, the property data 6, and the response frequency RT for each group (common group or non-common group), so that the proxy response program 10Q is generated.

The proxy response program generating portion 102 prepares an empty text file (Step #718). As codes for a group having the highest response frequency RT, codes indicating the following matters (C1)-(C4) are written, in order, into the text file (Step #719).
(C1) Identifier for identifying the subject group;
(C2) Response frequency RT of the subject group;
(C3) Code for comparing whether or not the values of the items indicated in the property data 6 for the subject group are equal to the values of the items corresponding to the packets received in the sleep mode or the standby mode; and
(C4) Command for performing, if it is found out that the values of all the items are equal to one another through the comparison of C3, processing of sending the response data 5b of the subject group to the transmission source of the received packets.

The identifier in C1 may be described in, for example, REM (remark) text. The same is similarly applied to the response frequency RT in C2.

The code in C3 may be described in IF text. When the property data 6 has a plurality of items, comparison codes may be described in IF text for each item.

The command in C4 may be described in such a manner that the source port number indicated in packets received as the source port number is used as needed.

The proxy response program generating portion 102 then adds, to the text file, the codes indicating the matters C1-C4 for a group having the second highest response frequency RT, a group having the third highest response frequency RT, and so on in succession (Step #719-Step #721). At this time, the proxy response program generating portion 102 adds the codes in such a manner that codes for a group having a higher response frequency RT is listed higher.

In this way, a code represents packets having constant attributes and a pattern of constant response contents. The text file describing the code corresponds to the proxy response program 10Q.

According to the normal-time record data 5 of FIGS. 7-9, a program corresponding to the procedure shown in FIG. 13 is generated as the proxy response program 10Q.

When the proxy response program generating portion 102 generates the proxy response program 10Q, the proxy response program applying portion 103 writes the proxy response program 10Q into an SRAM of the proxy response CPU 133 (hereinafter, referred to as an "SRAM 133s"). Thereby, the proxy response program 10Q is applied to the proxy response CPU 133.

When the proxy response program 10Q is applied to the proxy response CPU 133, the normal-time record data collecting portion 101 finishes collecting the normal-time record data 5. After that, the power managing CPU 137 may change the mode for supplying power appropriately.

While the image forming apparatus 1 is placed in the sleep mode or standby mode, the proxy response CPU 133 performs processing according to the steps shown in FIG. 14.

If a packet 82 is received (Yes in #731 of FIG. 14), then the proxy response CPU 133 performs processing on the packet 82 based on the proxy response program 10Q (Step #732). When the proxy response program 10Q is obtained which has the steps shown in FIG. 13, the packet 82 is processed as follows.

The proxy response CPU 133 compares the first property data 6, namely, the property data 61, with the packet 82 to check whether or not the values of all the items shown in the property data 61 are indicated in the packet 82 (Step #741 of FIG. 13). If the values of all the items are indicated in the packet 82 (Yes in Step #742), then the proxy response CPU 133 sends the response data 5b corresponding to the property data 61 to the transmission source of the packet 82 (Step #743). At this time, the source port number of the packet 82 is used if necessary.

The same processing is performed on the second property data 6 and beyond (Step #744-Step #746). To be specific, the proxy response CPU 133 compares each of the second property data 6 and beyond with the packet 82. If the values of all the items are indicated in the packet 82, then the proxy response CPU 133 sends the response data 5b corresponding thereto to the transmission source of the packet 82. The proxy response processing may be finished at a time when a reply (proxy response) to the transmission source of the packet 82 is made successfully.

Referring back to FIG. 14, if the proxy response based on the proxy response program 10Q is performed successfully (Yes in Step #733), then the foregoing processing is executed in response to the receipt of the packet 82, provided that the image forming apparatus 1 is still put in the sleep mode or the standby mode (No in Step #734).

On the other hand, unless the proxy response based on the proxy response program 10Q is performed successfully (No in Step #733), then the proxy response CPU 133 cancels the sleep mode or the standby mode, and causes the main CPU 131 to perform the processing on the packet 82.

The number of groups may be so limited that the proxy response program 10Q is contained in the SRAM 133s. For example, a predetermined number of groups may be selected in order from the group having the highest response frequency RT, and only codes of the selected groups may be written into the proxy response program 10Q. In short, if the number of execution times of the processing in Step #719 reaches a predetermined number of times, after that, writing codes of groups are preferably stopped.

The proxy response program 10Q is saved to the proxy response program storing portion 122 for appropriate update later.

When the packet 82 is received while the image forming apparatus 1 is put in the normal mode, not the proxy response CPU 133 but the main CPU 131 performs the response processing.

[Function to Update Proxy Response Program]

Figure 15:
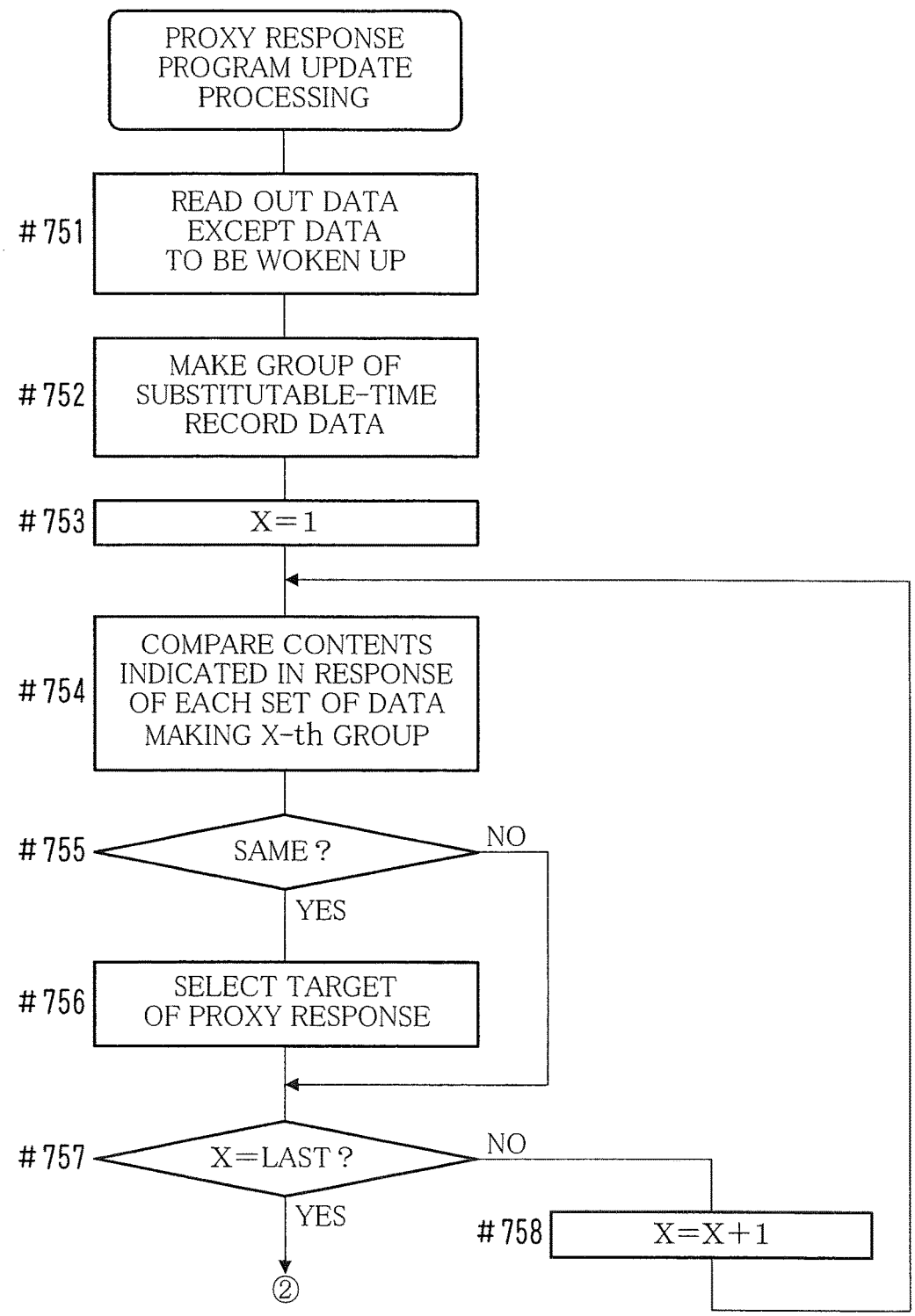
FIG. 15 is a flowchart depicting an example of the flow of processing for updating a proxy response program.
Figure 16:
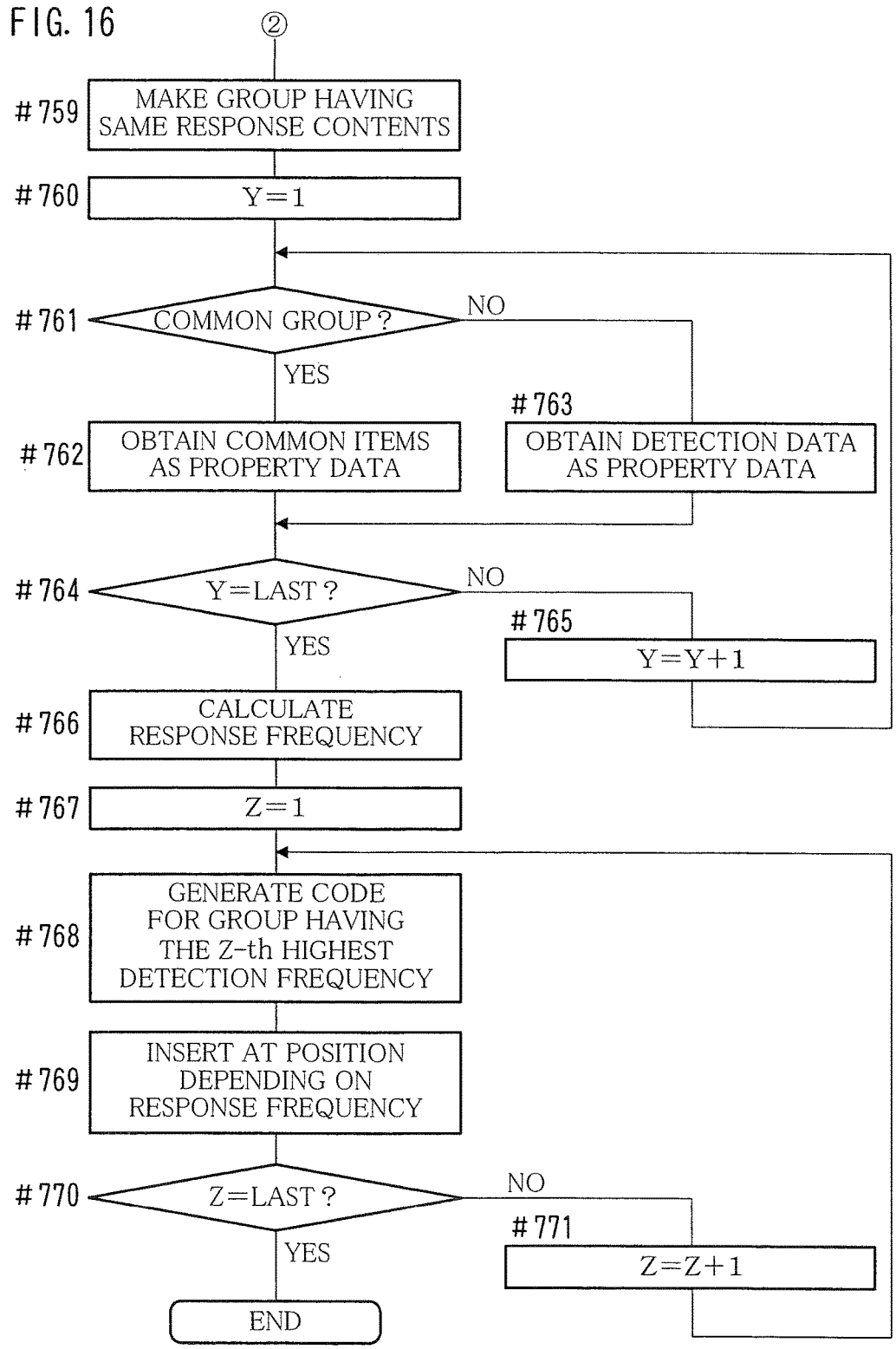
FIG. 16 is a flowchart depicting an example of the flow of processing for updating a proxy response program.

FIGS. 15 and 16 are flowcharts depicting an example of the flow of processing for updating the proxy response program.

In some cases, it is preferable that the proxy response program 10Q is updated depending on the change in the image forming apparatus 1 or the environment therearound. In view of this, after the proxy response program 10Q is applied to the proxy response CPU 133, the substitutable-time record data collecting portion 104 through the restart portion 107 shown in FIG. 4 perform processing for updating the proxy response program 10Q.

After the proxy response program 10Q is applied, the substitutable-time record data collecting portion 104 performs processing for collecting the substitutable-time record data 7. The content of the substitutable-time record data 7 is similar to that of the normal-time record data 5 shown in FIG. 5. Therefore, a method for collecting the substitutable-time record data 7 is basically the same as that for collecting the normal-time record data 5 by the normal-time record data collecting portion 101.

Unlike the case where the normal-time record data collecting portion 101 forces the normal mode to be kept, the substitutable-time record data collecting portion 104 does not force the normal mode to be kept. The substitutable-time record data 7 is therefore collected only when the image forming apparatus is put in the normal mode. The substitutable-time record data 7 is stored into the substitutable-time record data storing portion 123.

The proxy response program updating portion 105 updates the proxy response program 10Q based on the substitutable-time record data 7 stored (accumulated) in the substitutable-time record data storing portion 123 according to the steps shown in FIGS. 15-16.

The procedure up to the step of making groups to generate codes indicating the matters C1-C4 for each group (common group or non-common group) is basically the same as that of processing by the proxy response program generating portion 102 described earlier with reference to FIGS. 10 and 11 except for the following respects.

The proxy response program updating portion 105 uses the substitutable-time record data 7 instead of the normal-time record data 5. In Step #766 of FIG. 16, the response frequency RT for a group is calculated by dividing the number of sets of substitutable-time record data 7 which is a member of the group by a period Tj from the start of application of the proxy response program 10Q to the start of the update processing. The proxy response program updating portion 105 does not prepare an empty text file (refer to Step #718 of FIG. 11). The proxy response program updating portion 105 performs, on the proxy response program 10Q stored in the proxy response program storing portion 122, the insert processing discussed below.

The proxy response program updating portion 105 inserts the codes indicating the matters C1-C4 for the group into the proxy response program 10Q at a position depending on the response frequency RT for the group (Steps #768 and #769). For example, if the response frequency RT for the group is higher than any other response frequencies RT for the groups already added to the proxy response program 10Q, then the proxy response program updating portion 105 adds the codes indicating the matters C1-C4 to the top of the proxy response program 10Q. If the response frequency RT for the group is lower than any other response frequencies RT for the groups already added to the proxy response program 10Q, then the proxy response program updating portion 105 adds the codes indicating the matters C1-C4 to the end of the proxy response program 10Q. If the response frequency RT for the group is lower than the response frequency RT for the N-th group already added to the proxy response program 10Q and is higher than the response frequency RT for the (N+1)-th group, then he proxy response program updating portion 105 adds the codes indicating the matters C1-C4 next to the code for the N-th group.

As the result of the processing shown in FIGS. 15 and 16, if the number of groups corresponding to the proxy response program 10Q in which codes are indicated is greater than a predetermined number, then the codes for a lower group may be deleted from the proxy response program 10Q so that the number of such groups falls within the predetermined number.

The updated program applying portion 106 writes the proxy response program 10Q updated by the proxy response program updating portion 105 onto the SRAM 133s. The old proxy response program 10Q is deleted. Thereby, the proxy response program 10Q is updated and the resultant is applied to the proxy response CPU 133.

In the meantime, depending on the change in the image forming apparatus 1 or the environment therearound, any of the groups corresponding to the proxy response program 10Q in which codes are indicated is sometimes turned into a group that is not to make a response in place of another. To cope with this, it is possible to generate again the proxy response program 10Q from the beginning periodically, or, in accordance with the input of a predetermined command by an administrator.

When it is necessary to generate again the proxy response program 10Q from the beginning, the restart portion 107 deletes the proxy response program 10Q stored into each of the SRAM 133s and the proxy response program storing portion 122. Then, the restart portion 107 restarts the customizer program 10P.

In response to the restart, the processing by the normal-time record data collecting portion 101 is executed from the beginning as discussed above.

The processing for updating the proxy response program 10Q by the substitutable-time record data collecting portion 104 through the updated program applying portion 106 is not always required. The substitutable-time record data collecting portion 104 through the updated program applying portion 106 may stop, if the frequency of receiving the packet 81 and waking up (changing to the normal mode) during the sleep mode or the standby mode after the application of the proxy response program 10Q is lower than a predetermined frequency. The predetermined frequency may be set in advance by the administrator.

The processing by the restart portion 107 may be executed automatically when the image forming apparatus 1 detects a change in environment (for example, change of segment to which the image forming apparatus 1 belongs, or change of subnet mask). Such a change may be detected by using a known technology. Alternatively, the processing by the restart portion 107 may be executed when the image forming apparatus 1 is moved from an installation site to another installation site.

Figure 17:
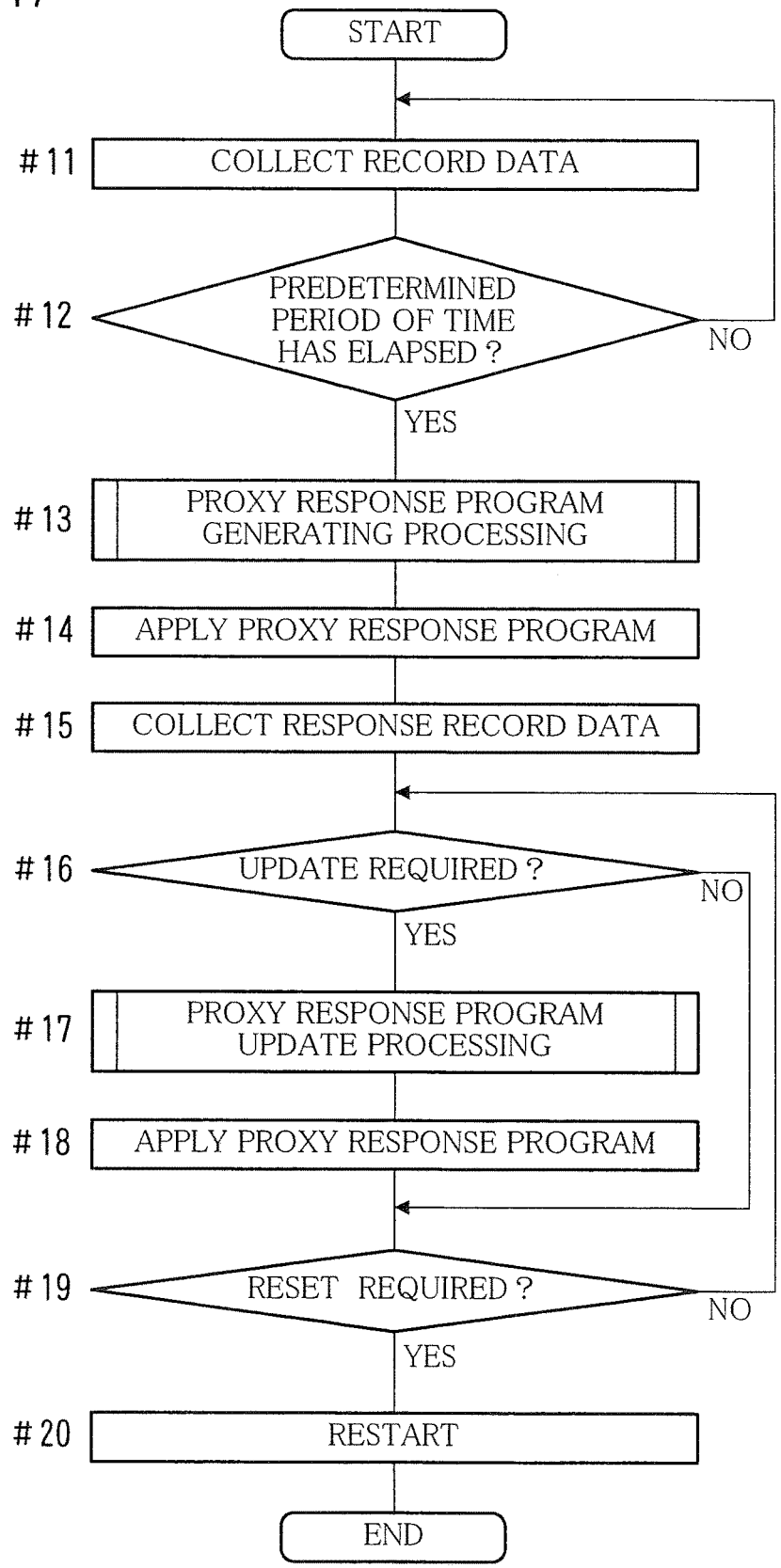
FIG. 17 is a flowchart depicting an example of the flow of the entire processing based on a program for customization.

FIG. 17 is a flowchart depicting an example of the flow of the entire processing based on a program for customization.

The description goes on to the flow of the entire processing for generating and updating the proxy response program 10Q by the main CPU 131 of the image forming apparatus 1 with reference to the flowchart of FIG. 17.

The main CPU 131 keeps the power supply mode at the normal mode during a predetermined period of time Tp after starting the customizer program 10P, and in response to the receipt of the packet 81, generates and accumulates the normal-time record data 5 (Step #11 of FIG. 17).

After the predetermined period of time Tp has elapsed (Yes in Step #12), the main CPU 131 generates the proxy response program 10Q based on the accumulated normal-time record data 5 (Step #13). The method for generating the proxy response program 10Q is the same as that described earlier with reference to FIGS. 10 and 11. The main CPU 131 stores the proxy response program 10Q generated into the SRAM 133s (Step #14). In this way, the proxy response program 10Q is applied to the proxy response CPU 133.

After that, when the image forming apparatus 1 is placed in the sleep mode or the standby mode, the proxy response CPU 133 executes the response processing based on the proxy response program 10Q. This is the same as that described earlier with reference to FIGS. 13 and 14.

On the other hand, when the image forming apparatus 1 is placed in the normal mode, in response to the receipt of the packet 81, the main CPU 131 generates and accumulates the substitutable-time record data 7 (Step #15). If a predetermined period of time has elapsed, or, alternatively, if a predetermined command is entered (Yes in Step #16), then the main CPU 131 updates the proxy response program 10Q (Step #17). The update processing is the same as that described earlier with reference to FIGS. 15 and 16. The main CPU 131 stores the proxy response program 10Q updated into the SRAM 133s (Step #18). Thereby, the updated proxy response program 10Q is applied to the proxy response CPU 133.

If the need arises to generate again the proxy response program 10Q from the beginning (Yen in Step #19), then the main CPU 131 deletes the proxy response program 10Q from the proxy response program storing portion 122 and the SRAM 133s, and restarts the customizer program 10P (Step #20).

After the restart, the main CPU 131 performs the processing from Step #11 again based on the customizer program 10P.

According to this embodiment, the proxy response program 10Q is generated depending on the environment of the image forming apparatus 1 and the environment therearound, and the generated proxy response program 10Q is applied to the proxy response CPU 133. Therefore, it is possible to make a controller which acts in place of another, i.e., the proxy response CPU 133, perform the response processing in place of the main CPU 131 more flexibly and appropriately than is conventionally possible. Further, it is possible to deal with the change in environment more flexibly and appropriately than is conventionally possible.

Since the proxy response program 10Q is stored into the SRAM 133s, the power consumption can be reduced as compared to the case where the proxy response program 10Q is stored into the DRAM.

Figure 18:
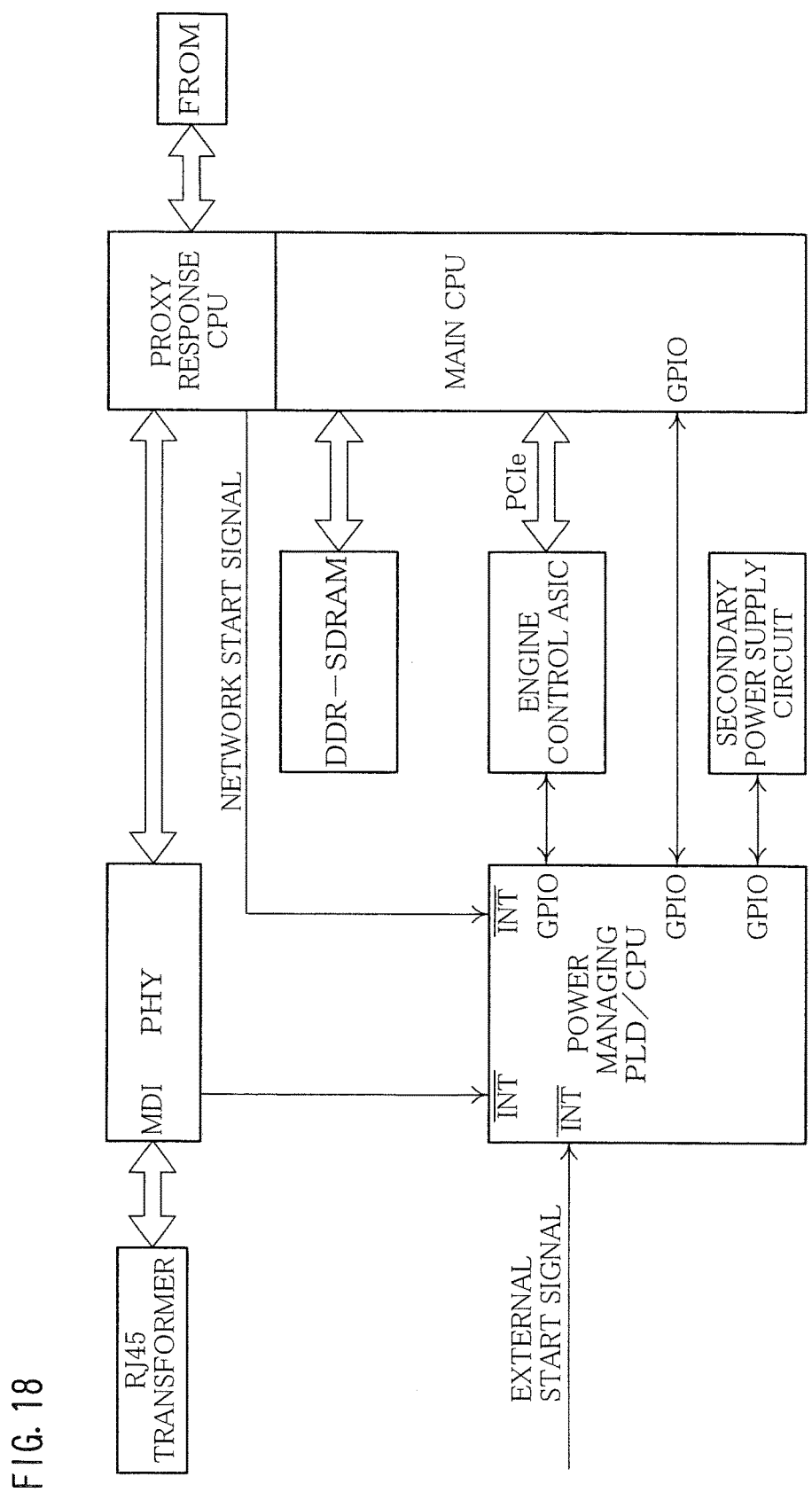
FIG. 18 is a diagram showing a modified example of the hardware configuration of a control unit.

FIG. 18 shows a modified example of the hardware configuration of the control unit 10a. In this embodiment, the example is described in which the control unit 10a has the configuration shown in FIG. 3. The present invention is also applicable to the case where the proxy response CPU is incorporated into the main CPU as shown in FIG. 18.

In this embodiment, the image forming apparatus 1 generates or updates the proxy response program 10Q. Instead of this, however, another device may generate or update the proxy response program 10Q. For example, a server is provided in the network system 3, and the server may generate or update the proxy response program 10Q. Alternatively, a so-called cloud server may generate or update the proxy response program 10Q.

If the network system 3 has a plurality of image forming apparatuses 1, the proxy response program 10Q generated or updated for one of the image forming apparatuses 1 may be applied to the other image forming apparatus 1. In such a case, the proxy response program 10Q may be provided directly from one image forming apparatus 1 to the other image forming apparatus 1. Alternatively, the proxy response program 10Q may be stored into the server and downloaded therefrom appropriately. In such a case, the destination MAC address and the destination IP address indicated in the proxy response program 10Q is changed depending on the image forming apparatus 1 to which the proxy response program 10Q is applied.

In this embodiment, even if the number of sets of normal-time record data 5 is two, the two sets are made into one group. In order to increase the certainty of a constant pattern, a predetermined number of sets (more than two sets) of normal-time record data 5 or more may be grouped into one group. Alternatively, even only one set of normal-time record data 5, the set of normal-time record data 5 may be grouped into one group.

In this embodiment, the group whose code is added to the proxy response program 10Q is limited based on the number. Instead of this, however, the group may be limited based on the size (number of bytes) of the proxy response program 10Q.

The embodiment takes the example in which the target for power saving is the image forming apparatus 1. The present invention may be also applied to the case where the target for power saving is another device. The present invention may be applied to, for example, a server, a personal computer, or the like.

Which items the detection data 5a (see FIG. 5) is to contain is variable appropriately depending on the environment in which the image forming apparatus 1 is used. In the example of FIG. 5, while the destination MAC address and the source MAC address are not contained in the detection data 5a, they may be contained therein. Alternately, only protocol may be included therein.

It is to be understood that the configurations of the network system 3 and the image forming apparatus 1, the constituent elements thereof, the content and order of the processing, the configuration of table, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A communication device, comprising:
   a main controller, the main controller is a main processor of the communication device;
   a second controller that responds to received data based on a proxy program independently of the main controller;
   a storage that stores, every time data is received, an attribute of the data and a detail of a response to the data made by the main controller,
   wherein the main processor:
      determines, based on the detail of the response to the data, whether or not the received data is data that can respond independently of the main controller,
      as to a plurality of sets of the data that can respond independently of the main controller, i) compares the detail of the response to the data and the attribute of the data, and ii) determines, based on a result of the comparison between the detail of the response to the data and the attribute of the data, which pattern of patterns the received data corresponds to,
      generates, based on the determined pattern, the proxy program for the second controller to send, in return, a detail of a response to the determined pattern, and stores the proxy program in the second controller.

2. The communication device according to claim 1, wherein the main processor determines that the pattern is a pattern in which the details of the response to data on one of the attributes is constant, and generates, as the proxy program, a program containing a code for response based on the details for a case where the data on said one of the attributes is received.

3. The communication device according to claim 1, wherein the attributes contain a type of a protocol.

4. The communication device according to claim 1, wherein, when the main controller is inactive, the second controller responds to the received data based on the proxy program.

5. The communication device according to claim 4, wherein, when it is impossible for the second controller to respond to the received data based on the proxy program, the second controller wakes up the main controller.

6. The communication device according to claim 1, wherein:
the second controller includes a Static Random Access Memory (SRAM), and
the main processor further:
applies the proxy program by writing the proxy program onto the SRAM, and
generates the proxy program in such a manner that, if the at least one pattern includes a plurality of patterns, a quantity of the patterns reaches a predetermined quantity or smaller.

7. The communication device according to claim 6, wherein the main processor generates the proxy program by selecting, from among the patterns, a pattern that appears more often than the other patterns.

8. The communication device according to claim 1, further comprising:
a second storage that stores, after the proxy program is applied to the second controller, every time the main controller responds to the received data, a second combination of attributes of the received data and details of the response,
wherein the main processor further:
determines the pattern based on a plurality of the second combinations stored in the second storage to update the proxy program based on the pattern determined, and
applies the updated proxy program to the second controller.

9. The communication device according to claim 8, wherein the main processor further:
determines that the pattern is a pattern in which the details of the response to data on one of the attributes is constant, and
updates the proxy program by adding, to the proxy program, a code for response based on the details for a case where the data on said one of the attributes is received.

10. The communication device according to claim 1, wherein the main processor generates the proxy program when a change in a network environment is detected.

11. A method for customizing a communication device including a main controller and a second controller that responds to received data based on a proxy program independently of the main controller, the method comprising:
causing a storage to store, every time the communication device receives data, a combination of attributes of the data and details of a response to the data made by the main controller;
determining, based on the detail of the response to the data, whether or not the received data is data that can respond independently of the main controller,
as to a plurality of sets of the data that can respond independently of the main controller, i) comparing the detail of the response to the data and the attribute of the data, and ii) determining, based on a result of the comparison between the detail of the response to the data and the attribute of the data, which pattern of patterns the received data corresponds to,
generating, based on the determined pattern, the proxy program for the second controller to send, in return, a detail of a response to the determined pattern, and
storing the proxy program in the second controller.

12. A non-transitory computer-readable storage medium storing thereon a computer program used to customize a communication device, the communication device including a main controller functioning as a main controller and a second controller that responds to received data based on a proxy program independently of the main controller, the computer program causing a computer to perform processing comprising:
first processing for causing a storage to store, every time the communication device receives data, a combination of attributes of the data and details of a response to the data made by the main controller,
second processing for:
determining, based on the details of the response to the data, whether or not the received data is data that can respond independently of the main controller,
as to a plurality of sets of the data that can respond independently of the main controller, i) comparing the details of the response to the data and the attribute of the data, and ii) determining, based on a result of the comparison between the details of the response to the data and the attribute of the data, which pattern of patterns the received data corresponds to,
generating, based on the determined pattern, the proxy program for the second controller to send, in return, a detail of a response to the determined pattern, and
third processing for storing the proxy program in the second controller.

13. The non-transitory computer-readable storage medium according to claim 12, wherein the second processing includes determining that the pattern is a pattern in which the details of the response to data on one of the attributes is constant, and generating, as the proxy program, a program containing a code for response based on the details for a case where the data on said one of the attributes is received.

14. The non-transitory computer-readable storage medium according to claim 12, wherein the attributes contain a type of a protocol.

15. The non-transitory computer-readable storage medium according to claim 12, wherein, when the main controller is inactive, the second controller responds to the received data based on the proxy program.

16. The non-transitory computer-readable storage medium according to claim 15, wherein, when it is impossible for the second controller to respond to the received data based on the proxy program, the second controller wakes up the main controller.

17. The non-transitory computer-readable storage medium according to claim 12, wherein
the second controller includes a Static Random Access Memory (SRAM),
the third processing includes applying the proxy program by writing the proxy program onto the SRAM, and
if the at least one pattern includes a plurality of patterns, the second processing includes generating the proxy program in such a manner that a quantity of the patterns reaches a predetermined quantity or smaller.

18. The non-transitory computer-readable storage medium according to claim 17, wherein the second processing includes generating the proxy program by selecting, from among the patterns, a pattern which appears more often than the other patterns.

19. The non-transitory computer-readable storage medium according to claim 12, wherein the computer program causes the computer to perform:
fourth processing for storing, after the proxy program is applied to the second controller, every time the main controller responds to the received data, a second combination of attributes of the received data and details of the response, fifth processing for determining the pattern based on a plurality of the second combinations stored in a second storage to update the proxy program based on the pattern determined, and sixth processing for applying the proxy program updated to the second controller.

20. The non-transitory computer-readable storage medium according to claim 19, wherein the fifth processing includes determining that the pattern is a pattern in which the details of the response to data on the constant attributes are fixed, and updating the proxy program by adding, to the proxy program, a code for response based on the details for a case where the data on the constant attributes is received.

21. The non-transitory computer-readable storage medium according to claim 12, wherein the computer program causes the computer to perform the second processing when a change in a network environment is detected.

22. The communication device according to claim 1, wherein:
the main processor further generates response data in response to the received data, and
the response data indicates a content of a processing performed by the communication device in response to receipt of the received data.

* * * * *